(12) United States Patent
Gladney et al.

(10) Patent No.: US 11,793,323 B2
(45) Date of Patent: Oct. 24, 2023

(54) COMPRESSIBLE MATTRESS

(71) Applicant: Dreamwell, Ltd., Doraville, GA (US)

(72) Inventors: Richard F. Gladney, Fairburn, GA (US); Robert Hellyer, Doraville, GA (US)

(73) Assignee: DREAMWELL, LTD., Doraville, GA (US)

( * ) Notice: Subject to any disclaimer, the term of this patent is extended or adjusted under 35 U.S.C. 154(b) by 283 days.

(21) Appl. No.: 17/004,703

(22) Filed: Aug. 27, 2020

(65) Prior Publication Data
US 2022/0061546 A1    Mar. 3, 2022

(51) Int. Cl.
| | | |
|---|---|---|
| A47C 27/15 | (2006.01) |
| A47C 27/06 | (2006.01) |
| B32B 5/02 | (2006.01) |
| B32B 5/18 | (2006.01) |
| B32B 27/40 | (2006.01) |
| B32B 5/32 | (2006.01) |
| B32B 7/022 | (2019.01) |
| A47C 27/14 | (2006.01) |

(52) U.S. Cl.
CPC ............ *A47C 27/15* (2013.01); *A47C 27/064* (2013.01); *A47C 27/148* (2013.01); *B32B 5/02* (2013.01); *B32B 5/18* (2013.01); *B32B 5/32* (2013.01); *B32B 7/022* (2019.01); *B32B 27/40* (2013.01); *B32B 2266/0278* (2013.01); *B32B 2305/18* (2013.01); *B32B 2307/302* (2013.01); *B32B 2307/51* (2013.01)

(58) Field of Classification Search
CPC ... A47C 21/046; A47C 27/064; A47C 27/148; A47C 27/15; A47C 27/056; B32B 2266/0278; B32B 5/02; B32B 5/18; B32B 2305/18; B32B 2307/302; B32B 2307/51; B32B 27/40; B32B 5/245; B32B 5/32
See application file for complete search history.

(56) References Cited

U.S. PATENT DOCUMENTS

| | | |
|---|---|---|
| 6,868,569 B2 | 3/2005 | Vansteenburg |
| 7,047,581 B2 | 5/2006 | Gladney |
| 7,168,117 B2 | 1/2007 | Gladney et al. |
| 8,099,811 B2 | 1/2012 | Gladney et al. |
| 8,418,297 B2 | 4/2013 | Mikkelsen et al. |

(Continued)

FOREIGN PATENT DOCUMENTS

WO    2020232161 A1    11/2020

OTHER PUBLICATIONS

International Search Report for Application No. PCT/US2021/047656 dated Mar. 14, 2022, 7 pages.

(Continued)

*Primary Examiner* — Hai Vo
(74) *Attorney, Agent, or Firm* — CANTOR COLBURN LLP

(57) ABSTRACT

Compressible mattress assemblies for bed in a box applications consist of a first polymeric foam layer and a second polymeric foam layer, wherein the first polymeric foam layer has a thickness less than the second polymeric foam layer and has a property and/or a foam material that is different from the second polymeric foam layer. In other embodiments, the compressible mattress assemblies consist of a pocketed microcoil array intermediate the first and second polymeric foam layers.

14 Claims, 1 Drawing Sheet

(56) References Cited

U.S. PATENT DOCUMENTS

| | | | |
|---|---|---|---|
| 9,504,333 B2 | 11/2016 | Rawl-Meehan et al. | |
| 9,877,591 B2 | 1/2018 | Morgan et al. | |
| 10,182,662 B2 | 1/2019 | Duwell et al. | |
| 2008/0256706 A1 | 10/2008 | Larsen | |
| 2009/0165213 A1 | 7/2009 | Collins et al. | |
| 2015/0351557 A1 | 12/2015 | Allen | |
| 2016/0213162 A1 | 7/2016 | Subhedar et al. | |
| 2016/0220031 A1 | 8/2016 | Alzoubi et al. | |
| 2016/0304231 A1* | 10/2016 | Corodemus | B65B 5/045 |
| 2019/0335914 A1 | 11/2019 | Sadiq et al. | |
| 2022/0061544 A1* | 3/2022 | Gladney | A47C 27/064 |

OTHER PUBLICATIONS

International Search Report and Written Opinion for Application No. PCT/US2021/047655, dated Dec. 13, 2021, 16 pages.

\* cited by examiner

COMPRESSIBLE MATTRESS

BACKGROUND

The present disclosure generally relates to a compressible mattress for use in a bed in a box application.

Standalone mattresses are relatively bulky and heavy making it difficult for the customer to purchase, take home a mattress, and maneuver the mattress to its desired location. Oftentimes, at least two people are needed to lift and maneuver the mattress from the retail store to the desired location. Moreover, with respect to delivery, added costs and the associated difficulty in scheduling a mutually agreeable delivery time can serve as an impediment to a sale. It is, however, now known to compress a mattress and to provide the mattress to the customer in a compressed state in a box at the retail store. These mattresses are often referred to as a bed in a box.

Purchasing a bed in a box provides the costumer with convenience in immediate transport from the retail store to the home setting. The bed in a box makes maneuvering tight spaces like stairways and corners painless. The ed user only needs to unpack, roll out and allow the compressed mattress to expand and reach its full shape. Advantageously, transport and set up of the bed in a box can be readily accomplished by a single person.

BRIEF SUMMARY

Disclosed herein are compressible mattress assemblies for bed in a box applications. In one or more embodiments, the compressible mattress assembly includes a first polymeric foam layer; and a second polymeric foam layer, wherein the first polymeric foam layer has a thickness less than the second polymeric foam layer and has a property and/or a foam material that is different from the second polymeric foam layer. A fabric covering encapsulates the first and second polymeric foam layers.

In one or more embodiments, the compressible mattress assemblies consist of a first polymeric foam layer; a second polymeric foam layer, wherein the first polymeric foam layer has a thickness less than the second polymeric foam layer and has a property and/or a foam material that is different from the second polymeric foam layer; and a pocketed microcoil array intermediate the first and second polymeric foam layer, the pocketed microcoil array having an unloaded height of less than 4 inches. A fabric covering encapsulates the first and second polymeric foam layers and the pocketed microcoil array.

In one or more embodiments, a compressible mattress assembly for a bed in a box application, the compressible mattress assembly includes a first polymeric foam layer; a second polymeric foam layer, wherein the first polymeric foam layer has a thickness less than the second polymeric foam layer; and a fabric covering encapsulating the first and second polymeric foam layers, wherein a selected one of the first and second polymeric foam layers comprises a thermally conductive material and/or a phase change material in and proximate to at least a surface thereof.

The disclosure may be understood more readily by reference to the following detailed description of the various features of the disclosure and the examples included therein.

BRIEF DESCRIPTION OF THE DRAWINGS

Referring now to the figures wherein the like elements are numbered alike.

DETAILED DESCRIPTION

Figure 1:
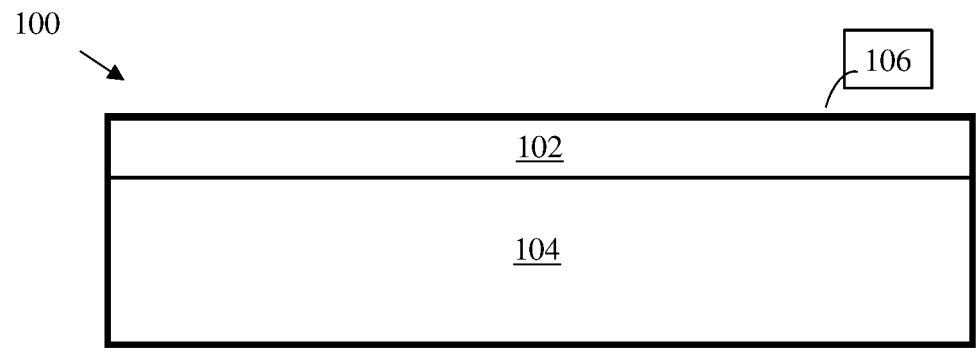
FIG. 1 illustrates a cross section of a compressible mattress assembly consisting of first and second polymeric foam layers in accordance with one or more embodiments of the present invention.

Disclosed herein are compressible mattress assemblies for bed in a box application. As will be discussed in greater detail below, the compressible mattress assemblies are asymmetrical in terms of construction and are configured to be two sided to provide the end user with a choice of different parameters depending on the side to be used as the contact surface. In this manner, the end user can choose which side of the mattress meets its desired characteristics in terms of firmness, coolness, comfort, and/or the like. By way of example, each side can have different firmness properties, different support materials, and/or different cooling properties. The compressible mattress assemblies are configured to be compressed for insertion into a box. Typically, the mattress assembly is packaged, evacuated to compress the mattress assembly, and folded to meet the dimensions of the box. Upon removal of the compressed mattress from the box and the packaging, the mattress decompresses to a planar configuration for use a sleep support surface.

The compressible mattress assemblies may be of any size, including standard sizes such as a twin, queen, oversized queen, king, or California king sized mattress, as well as custom or non-standard sizes constructed to accommodate a particular user or a particular room. By way of example, the compressible mattress assemblies could be a smaller mattress designed for a child or baby. Such a mattress may be part of a crib or cradle. The compressible mattress assemblies are generally configured as two sided. In one or more embodiments, the compressible mattress assemblies in accordance with the present disclosure have an overall thickness of about 6 inches to about 14 inches.

For the purposes of the description hereinafter, the terms "upper", "lower", "top", "bottom", "left," and "right," and derivatives thereof shall relate to the described structures, as they are oriented in the drawing figures. The same numbers in the various figures can refer to the same structural component or part thereof. Additionally, the articles "a" and "an" preceding an element or component are intended to be nonrestrictive regarding the number of instances (i.e. occurrences) of the element or component. Therefore, "a" or "an" should be read to include one or at least one, and the singular word form of the element or component also includes the plural unless the number is obviously meant to be singular.

Spatially relative terms, e.g., "beneath," "below," "lower," "above," "upper," and the like, can be used herein for ease of description to describe one element or feature's relationship to another element(s) or feature(s) as illustrated in the figures.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

As used herein, the term "about" modifying the quantity of an ingredient, component, or reactant of the invention employed refers to variation in the numerical quantity that can occur, for example, through typical measuring and liquid handling procedures used for making concentrates or solutions. Furthermore, variation can occur from inadvertent error in measuring procedures, differences in the manufacture, source, or purity of the ingredients employed to make the compositions or carry out the methods, and the like.

It will also be understood that when an element, such as a layer, region, or substrate is referred to as being "on" or "over" another element, it can be directly on the other element or intervening elements can also be present. In contrast, when an element is referred to as being "directly on" or "directly over" another element, there are no intervening elements present, and the element is in contact with another element.

Referring now to FIG. ("FIG.") 1, there is depicted a cross sectional view of a two-sided compressible mattress assembly 100 in an uncompressed configuration in accordance with one or more embodiments of the present invention. The exemplary mattress assembly generally includes a first polymeric foam layer 102 and a second polymeric foam layer 104. The compressible mattress assembly can further include a fabric covering 106 encasing the first and second polymeric foam layers 102, 104. Each of the first and second polymeric foam layers has an outwardly facing planar top surface adapted to substantially face the user resting on the mattress assembly, depending on the orientation of the mattress assembly, and have length and width dimensions sufficient to support a reclining body of the user.

The first and second polymeric foam layer 102, 104 have different thicknesses relative to one another. In one or more embodiments, the thickness of the first polymeric layer is about 5 percent to about 40 percent of the overall thickness of the mattress assembly; in other embodiments, the thickness of the first polymeric layer is about 10 percent to about 40 percent of the overall thickness of the mattress assembly, and in still other embodiments, the thickness of the first polymeric layer is about 20 percent to about 40 percent of the overall thickness of the mattress assembly.

The first and second polymeric foam layers 104, 106 can be formed of, but are not limited to, polyurethane foams, latex foams including natural, blended and synthetic latex foams; polystyrene foams, polyethylene foams, polypropylene foam, polyether-polyurethane foams, and the like. Likewise, the foam can be selected to be viscoelastic or non-viscoelastic. Any of these foams may be open celled or closed cell or a hybrid structure of open cell and closed cell. Likewise, the foams can be reticulated, partially reticulated or non-reticulated foams. The term reticulation generally refers to removal of cell membranes to create an open cell structure that is open to air and moisture flow. Still further, the foams may be gel-infused in some embodiments and/or may include a phase change material. The different foam layers can be formed of the same material configured with different properties or configured with different materials.

By way of example of a mattress assembly construction including different materials, the first polymeric foam layer can be a latex foam and the second polymeric foam layer can be a polyurethane foam, or vice versa. In another example, the first polymeric foam layer can be a viscoelastic foam layer and the second polymeric foam layer can be a non-viscoelastic foam layer, and vice versa. The particular combinations are not intended to be limited and are generally defined by the desired comfort and feel desired by the end user.

By way of example of a mattress assembly construction including different properties, the first and second polymeric foam layers can be selected to have different hardness and/or density properties. In one or more embodiments, the thinner layer has a firmness greater than the thicker layer. In other embodiments, the thicker layer has a firmness greater than the thinner layer. In this manner, one of the first and second polymeric foam layers can be configured to have a soft feel and the other layer a firmer feel. The hardness of the layers generally have an indention load deflection (ILD) of 7 to 16 pounds force for viscoelastic foams and an ILD of 7 to 45 pounds force for non-viscoelastic foams. ILD can be measured in accordance with ASTM D 3575. The density of the layers can generally range from about 1 to 2.5 pounds per cubic foot for non-viscoelastic foams and 1.5 to 6 pounds per cubic foot for viscoelastic foams.

The fabric covering 106 can be any desired sheet of material, such as cotton, linen, synthetic fibers or a mixture thereof. The fabric covering can be quilted or non-quilted. Additionally, the fabric covering 16 can include additional layers such as a flame-retardant layer and/or backing layers (not shown). The various layers can be fixedly attached to one another by stitching, an adhesive, or the like to define a panel, which can be removable or non-removable, or can be individual layers.

Figure 2:
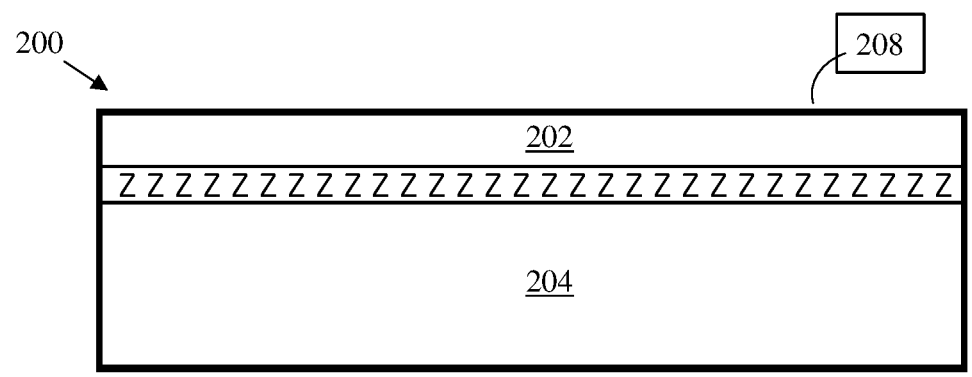
FIG. 2 illustrates a cross section of a compressible mattress assembly including a pocketed microcoil array intermediate first and second polymeric foam layers in accordance with one or more embodiments of the present invention.

Referring now to FIG. 2, there is depicted a cross sectional view of an exemplary two-sided compressible mattress assembly in accordance with one or more embodiments, which is generally designated by reference numeral 200. The compressible mattress assembly 200 includes three layers. The three layers include the first and second polymeric foam layers 202, 204 as previously described and a microcell layer 206 sandwiched between the first and second polymeric foam layers 202, 204. The three layers are encapsulated with a fabric covering 208.

The microcoil layer 206 includes a plurality of coils contained in separate pockets formed of a piece of fabric disposed between or surrounds each microcoil in the microcoil cell, i.e., pocketed coils. As used herein, a microcoil is a spring or coil that has a smaller height and diameter than conventional innersprings used in mattresses such as that used in a coil innercore. Suitable dimensions for each microcoil include, but are not limited to, a diameter and height of less than about 4 inches. In one or more embodiments, the diameter of less than about 3 inches and in still one or more other embodiments, a diameter of less than about 2 inches. In one or more embodiments, the height of less than about 3 inches and in still one or more other embodiments, a height of less than about 2 inches. The microcoils can be pre-compressed or uncompressed within the pocket. In addition, the microcoil generally constructed from a thinner or more flexible gauge of wire. In one or more embodiments, the gauge of the wire is greater than about 14 gauge.

In another embodiment, the gauge of the wire utilized in forming the microcoils is at least about 19 gauge. In one or more embodiments, each microcoil within the array can have a cylindrical shape with a generally circular cross section. In one or more other embodiments, each microcoil within the array can have other shapes including barrel shaped, hour-glass shaped or cone shaped and can have other cross-sectional shapes including oblong and rectangular.

The microcoil array can be in the form of a grid including rows and columns of pocketed microcoils. The microcoil array 206 as well as the first and second foam polymeric foam layers 202, 204 can be adhesively secured to one another.

The proposed microcoil construction for use in the mattress assembly can employ a stranded wire spring which is made of at least 2 wire strands that are twisted to form a multi-wire cord. The number of strands employed will vary according to the application and may vary based on the type of material used to form the strand. Thus, the wire may include two or more strands, and can include from three to fifty strands or just a single strand.

The strands may be twisted, weaved, clipped or bonded together and any suitable method for forming the stranded wire spring may be employed without departing from the scope of the invention. The strands may be steel, aluminum, plastic, copper, titanium, rubber or any other suitable material and the type of material selected will depend upon the application at hand. Moreover, the strands may have any suitable shape and may be long cylindrical wires, hexagonal wire, square wire or any other shape or geometry.

The stranded microcoils may also be sealed with a sealant, such as an epoxy. Thus, in alternative and optional embodiments, the strands may be coated or otherwise treated and the wire may be sealed or coated. Exemplary stranded wire for use in mattresses is disclosed in U.S. Pat. Nos. 7,047, 581, 7,168,117, and 8,099,811 incorporated herein by reference in its entireties.

The microcoil array 306 can span the width (W) and a portion of the length (L) of the mattress assembly 100 or may span a portion thereof. For example, in one or more embodiments, the microcoil array 206 spans the width dimension of the mattress assembly and is centrally located along the length (L). In one or more embodiments, the pocketed microcoil array 114 can have a length from about 6 inches to about 60 inches. In one or more other embodiments, the microcoil array 114 can have a length of about 12 to about 36 inches, and in still one or more other embodiments, the microcoil array 114 can have a length of about 18 to about 28 inches, which is positioned to generally correspond to the lumbar portion of the compressible mattress assembly. In one or more embodiments, the thickness of the microcoil array (i.e., overall height of the layer of the microcoil array) can be about 0.5 inches to about 4 inches; in one or more other embodiments, the thickness of the microcoil array can be about 0.5 inches to about 2 inches; and in still one or more other embodiments, the thickness of the microcoil array can be about 0.75 inches to about 1 inches.

Figure 3:
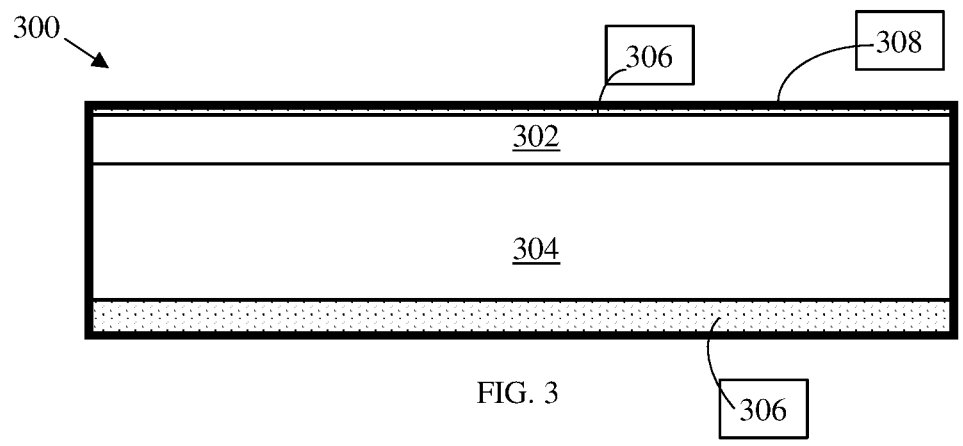
FIG. 3 illustrates a cross section of a compressible mattress assembly including a phase change material and/or thermally conductive material on and/or in at least one outwardly facing surface of the mattress assembly in accordance with one or more embodiments of the present invention

FIG. 3 depicts a cross sectional view of an exemplary two-sided compressible mattress assembly in accordance with one or more embodiments, which is generally designated by reference numeral 300. The compressible mattress assembly 200 includes at least the first and second polymeric foam layers 202, 204, respectively, as previously described. At least one of the outwardly facing surfaces and a portion underlying the surface of the first and second polymeric foam layers includes a phase change material and/or a thermally conductive material 208. As shown, each outwardly facing surface includes the phase change material and/or a thermally conductive material 206 albeit in different amounts to provide the end user with a choice as to the amount of cooling desired. The three layers are encapsulated with a fabric covering 208.

The phase change material (PCM) layer can be coated directly onto the foam layer.

PCMs generally operate on the principle that a material requires a relatively significant amount of energy (heat) to change from a solid to a liquid and then back from a liquid to a solid. PCMs can therefore absorb large amounts of heat or energy from their environment and return large amounts of heat to their environment. This effective absorption, store and release of heat can be used to help regulate the temperature of an environment.

In one or more embodiments, suitable PCMs include, without limitation, microencapsulated PCMs. Any of a variety of processes known in the art may be used to microencapsulate PCMs. One of the most typical methods which may be used to microencapsulate a PCM is to disperse droplets of the molten PCM in an aqueous solution and to form walls around the droplets using techniques such as coacervation, interfacial polymerization, or in situ polymerization, all of which are well known in the art. For example, the methods are well known in the art to form gelatin capsules by coacervation, polyurethane or polyurea capsules by interfacial polymerization, and urea-formaldehyde, urea-resorcinol-formaldehyde, and melamine formaldehyde capsules by in situ polymerization. The microencapsulated PCMs can then be dispersed in a liquid vehicle such as a gel and applied to the above noted foam surfaces.

Encapsulation of the PCM creates a tiny, microscopic container for the PCM. This means that regardless of whether the PCM is in a solid state or a liquid state, the PCM will be contained. The size of the microcapsules typically range from about 1 to 100 microns and more typically from about 2 to 50 microns. The capsule size selected will depend on the application in which the microencapsulated PCM is used.

The microcapsules will typically have a relatively high payload of phase change material, typically at least 70% by weight, more typically at least 80% by weight, and in accordance with some embodiments, the microcapsules may contain more than 90% phase change material.

Gelling agents useful in the present disclosure include polysaccharides, nonionic polymers, inorganic polymers, polyanions and polycations. Examples of polysaccharides useful in the present disclosure include, but are not limited to, alginate and natural ionic polysaccharides such as chitosan, gellan gum, xanthan gum, hyaluronic acid, heparin, pectin and carrageenan. Examples of ionically crosslinkable polyanions suitable for use in the practice of the present invention include, but are not limited to, polyacrylic acid and polymethacrylic acid. Ionically crosslinkable polycations such as polyethylene imine and polylysine are also suitable for use in the present invention. A specific example of a non-ionic polymer is polyvinylalcohol. Sodium silicates are examples of useful inorganic polymers.

The gelling agents are typically provided as an aqueous solution at a concentration and viscosity sufficient to provide the desired amount of coating on the microcapsules. The technology of microencapsulation is known to those skilled in the art as is the routine optimization of these parameters for the gelling agent.

The microencapsulated PCM can be dispersed in a liquid vehicle such as a gel and applied to a surface of the substrate.

The surface application can include immersion coating, spray coating, or the like. The particular application method is not intended to be limited.

The particular PCM is not intended to be limited and can be inorganic or organic. Suitable inorganic PCMs include salt hydrates made from natural salts with water. The chemical composition of the salts is varied in the mixture to achieve required phase-change temperature. Special nucleating agents can be added to the mixture to minimize phase-change salt separation. Suitable organic PCMs include fatty acids, waxes (e.g., paraffins) or the like.

In still other embodiments, one of the first and second polymeric layers can include thermally conductive fillers by themselves or in addition to the PCM. Thermally conductive fillers such as various fibers, powder, flakes, needles, and the like can be dispersed within the foam matrix. In one embodiment, the thermally conductive fillers are nanoparticles with at least one dimension that measures 1000 nanometers or less, e.g., nanowires, and nanostrands.

The thermally conductive fillers can be formed of metals, metal oxides, polymers, inorganic compounds and the like. By way of example, suitable materials may be made of carbon, graphene, graphite, platinum, aluminum, diamond, gold, silver, silicon, copper, iron, nickel, and the like; polymers such as stretched polyethylene nanofibers; and the like, and mixtures thereof. In most embodiments, the selected material has a thermal conductivity greater than 10 watts per meters-Kelvin (W/m*K). By way of example, aluminum has a thermal conductivity of about 235 W/m*K; stretched polyethylene fibers is estimated to be about 180 W/m*K, and graphene has a theoretical conductivity of about 5000 W/m*K.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A two-sided asymmetrical compressible mattress assembly for a bed in a box application, the compressible mattress assembly consisting of:
   a first polymeric foam layer having a thickness of 5 to 40% of the total thickness of the compressible mattress;
   a second polymeric foam layer;
   wherein the first and second polymeric foam layers, each have an indention load deflection (ILD) of from 7 to 45 pounds force,
   wherein the first polymeric foam layer has a thickness less than a thickness of the second polymeric foam layer and has a property that is different from the second polymeric foam layer such that the first polymeric foam layer provides an end user with a first feel and the second polymeric foam layer provides the end user with a second feel, wherein the first feel is different from the second feel,
   wherein the first polymeric foam layer has a greater ILD than the second polymeric foam; and
   a fabric covering encapsulating the first and second polymeric foam layers, wherein the compressible mattress assembly is in a compressed state within an evacuated package and folded, wherein the compressible mattress assembly is in a box.

2. The compressible mattress assembly of claim 1, wherein the first polymeric foam layer is a viscoelastic foam and the second polymeric foam layer is a non-viscoelastic foam.

3. The compressible mattress assembly of claim 1, wherein the first polymeric foam layer is a non-viscoelastic foam and the second polymeric foam layer is a viscoelastic foam.

4. The compressible mattress assembly of claim 1, wherein the first polymeric foam layer is a foam other than the polyurethane foam.

5. The compressible mattress assembly of claim 1, wherein one of the first and second polymeric foam layers comprises a phase change material on or proximate to at least a surface thereof.

6. The compressible mattress assembly of claim 1, wherein one of the first and second polymeric foam layers comprises a thermally conductive material in and proximate to at least a surface thereof.

7. A two-sided asymmetrical compressible mattress assembly for a bed in a box application, the compressible mattress assembly consisting of:
   a first polymeric foam layer having a thickness of 5 to 40% of the total thickness of the compressible mattress;
   a second polymeric foam layer;
   wherein the first and second polymeric foam layers, each have an indention load deflection (ILD) of from 7 to 45 pounds force,
   wherein the first polymeric foam layer has a thickness less than a thickness of the second polymeric foam layer and has a property that is different from the second polymeric foam layer such that the first polymeric foam layer provides an end user with a first feel and the second polymeric foam layer provides the end user with a second feel, wherein the first feel is different from the second feel,
   wherein the first polymeric foam layer has a greater ILD than the second polymeric foam;
   a pocketed microcoil array intermediate the first and second polymeric foam layers, the pocketed microcoil array having an unloaded height of less than 4 inches,
   wherein the pocketed microcoil array has a length dimension corresponding to a lumbar portion of the compressible mattress assembly; and
   a fabric covering encapsulating the first and second polymeric foam layers, wherein the compressible mattress assembly is in a compressed state within an evacuated package and folded, wherein the compressible mattress assembly is in a box.

8. The compressible mattress assembly of claim 7, wherein the first polymeric foam layer is a viscoelastic foam and the second polymeric foam layer is a non-viscoelastic foam.

9. The compressible mattress assembly of claim 7, wherein the first polymeric foam layer is a non-viscoelastic foam and the second polymeric foam layer is a viscoelastic foam.

10. The compressible mattress assembly of claim 7, wherein the first polymeric foam layer is a foam other than the polyurethane foam.

11. The compressible mattress assembly of claim 7, wherein one of the first and second polymeric foam layers comprises a phase change material on or proximate to at least a surface thereof.

12. The compressible mattress assembly of claim 7, wherein one of the first and second polymeric foam layers comprises a thermally conductive material in and proximate to at least a surface thereof.

13. The compressible mattress assembly of claim 7, wherein the pocketed microcoil array spans a width dimension of the mattress assembly and a portion of a length dimension of the mattress assembly.

14. The compressible mattress assembly of claim 7, wherein the pocketed microcoil array is configured and dimension to support a lumbar region of the mattress assembly.

* * * * *